(12) United States Patent
Jung

(10) Patent No.: US 9,821,293 B2
(45) Date of Patent: Nov. 21, 2017

(54) CATALYST FOR ABATING A NITROGEN OXIDE, METHOD FOR PREPARING THE SAME, AND CATALYST SYSTEM FOR ABATING A NITROGEN OXIDE

(71) Applicant: Hyundai Motor Company, Seoul (KR)

(72) Inventor: Chang-Ho Jung, Gyeonggi-Do (KR)

(73) Assignee: Hyundai Motor Corporation, Seoul (KR)

( * ) Notice: Subject to any disclaimer, the term of this patent is extended or adjusted under 35 U.S.C. 154(b) by 433 days.

(21) Appl. No.: 14/562,015

(22) Filed: Dec. 5, 2014

(65) Prior Publication Data

US 2015/0306571 A1  Oct. 29, 2015

(30) Foreign Application Priority Data

Apr. 24, 2014  (KR) .................. 10-2014-0049302

(51) Int. Cl.
| | |
|---|---|
| *B01J 23/58* | (2006.01) |
| *B01D 53/94* | (2006.01) |
| *B01J 23/02* | (2006.01) |
| *B01J 23/10* | (2006.01) |
| *B01J 35/04* | (2006.01) |
| *B01J 37/02* | (2006.01) |

(Continued)

(52) U.S. Cl.
CPC .......... *B01J 23/58* (2013.01); *B01D 53/9422* (2013.01); *B01J 21/10* (2013.01); *B01J 23/005* (2013.01); *B01J 23/02* (2013.01); *B01J 23/10* (2013.01); *B01J 23/63* (2013.01); *B01J 35/04* (2013.01); *B01J 37/0215* (2013.01); *B01J 37/0248* (2013.01); *B01D 2255/1021* (2013.01); *B01D 2255/1023* (2013.01); *B01D 2255/1025* (2013.01); *B01D 2255/2042* (2013.01); *B01D 2255/2047* (2013.01); *B01D 2255/2065* (2013.01); *B01D 2255/2092* (2013.01); *B01D 2255/40* (2013.01); *B01D 2255/91* (2013.01); *B01D 2255/9202* (2013.01)

(58) Field of Classification Search
None
See application file for complete search history.

(56) References Cited

FOREIGN PATENT DOCUMENTS

| | | |
|---|---|---|
| JP | 10-249199 A | 9/1998 |
| JP | 10249199 A * | 9/1998 |

(Continued)

OTHER PUBLICATIONS

Andou et al. JPH10249199A-translated document (1998).*

(Continued)

*Primary Examiner* — Walter D Griffin
*Assistant Examiner* — Jelitza Perez
(74) *Attorney, Agent, or Firm* — Mintz Levin Cohn Ferris Glovsky and Popeo, P.C.; Peter F. Corless

(57) ABSTRACT

A catalyst for abating a nitrogen oxide includes: a honeycomb substrate including a plurality of cell passages partitioned by a cell barrier rib; and a coating layer positioned on the internal side of the cell passages. The coating layer includes a support including Mg-substituted alumina ($MgAl_2O_4$), ceria (Ce), and a composite ceria; and Ba and a noble metal catalyst selected from the group consisting of Pt, Pd, Rh and combinations thereof, which are supported on the support. Also provided is a catalyst system for abating a nitrogen oxide includes the coating layer.

16 Claims, 6 Drawing Sheets

(51) Int. Cl.
  *B01J 21/10*  (2006.01)
  *B01J 23/00*  (2006.01)
  *B01J 23/63*  (2006.01)

(56) References Cited

FOREIGN PATENT DOCUMENTS

| | | |
|---|---|---|
| JP | 2013-139718 A | 7/2013 |
| JP | 2013-215651 A | 10/2013 |
| JP | 2013-215703 A | 10/2013 |
| KR | 10-2012-0125337 A | 11/2012 |

OTHER PUBLICATIONS

Scherzer, A.J. Impregnation. Catalyst Preparation and Manufacturing. Hydrocracking Science and Technology. 1996, p. 45. https://books.google.com/books?id=ZklQ5x__v6W0C&pg=PR7&dq=immersion+method+dipping+impregnation&source=gbs_selected_pages&cad=2#v=onepage&q=immersion%20method%20dipping%20impregnation&f=false.*

Chinajinti. Ceraminc Honeycomb Substrate. Ceramic Honeycombs. Jiangxi Jintai Special Material LLC. 2005. pp.1-2 http://www.ceramic-honeycombs.com/ceramic/Ceramic_Honeycomb_Substrate.htm.*

* cited by examiner

CATALYST FOR ABATING A NITROGEN OXIDE, METHOD FOR PREPARING THE SAME, AND CATALYST SYSTEM FOR ABATING A NITROGEN OXIDE

CROSS-REFERENCE TO RELATED APPLICATION

This application claims priority to and the benefit of Korean Patent Application No. 10-2014-0049302 filed in the Korean Intellectual Property Office on Apr. 24, 2014, the entire contents of which are incorporated herein by reference.

TECHNICAL FIELD

Disclosed are a catalyst for abating a nitrogen oxide, a method for preparing the catalyst, and a catalyst system for abating a nitrogen oxide including the catalyst.

BACKGROUND

An intercalation-type catalyst such as lean NOx trap (LNT) and NOx storage catalyst (NSC) for abating NOx intercalates NOx as a nitrate salt into a basic intercalation material such as Ba, Ce, and the like on a support. Accordingly, emission of the NOx in a lean operating area in all diesel vehicles where the NOx may not be easily suppressed by a reaction on a noble metal due to a high oxygen concentration in exhaust gas relative to a theoretical air-fuel ratio may be suppressed by the intercalation-type catalyst. When the NOx is intercalated for a predetermined time, for example, several minutes to tens of minutes, the catalyst reaches a limit of NOx intercalation capability, and thus, when the oxygen concentration in exhaust gas is decreased through post injection, while a reduction component such as CO/HC and the like is increased, the intercalated nitrate is deintercalated and substantially reduced into $N_2$ by a reducing agent such as HC, CO, $H_2$, and the like.

The LNT catalyst may have NOx intercalation performance at a temperature ranging from about 100 to about 400° C. based on a catalyst temperature, and also NOx reduction performance at a temperature of greater than or equal to about 250° C. In particular, an LNT catalyst for a diesel engine may also have NOx intercalation performance at a low catalyst temperature due to its low exhaust temperature by additionally including Ce other than a conventional NOx intercalation material of Ba. The NOx is mainly reduced on Pt and Rh in a rich condition, but since the LNT catalyst for a diesel engine is maintained at a catalyst temperature of less than or equal to about 250° C., the NOx reduction may not be activated. For example, in a city-drive mode at a speed less than about 60 km/h, a substantial amount of the NOx may be released.

SUMMARY OF THE INVENTION

In a preferred aspect, the present invention provides a catalyst for abating a nitrogen oxide by improving intercalation of a nitrogen oxide, thereby suppressing emission of the nitrogen oxide.

In further preferred aspect, the present invention provides a catalyst system for abating a nitrogen oxide and the catalyst system may include the catalyst for abating a nitrogen oxide. In an exemplary embodiment, a noble metal catalyst may include: a substrate including a plurality of cell passages partitioned with a cell barrier rib; and a coating layer positioned on the internal side of the cell passages. The coating layer may include: a support including magnesium (Mg)-substituted alumina ($MgAl_2O_4$), ceria ($CeO_2$), and a composite ceria; and barium (Ba) and one selected from the group consisting of platinum (Pt), palladium (Pd), rhodium (Rh), and a combination thereof which may be supported on the support.

The Ba may be supported in an amount of about 50 to about 70 wt % based on the total amount of the Ba on the Mg-substituted alumina ($MgAl_2O_4$), and less than or equal to about 20 wt % of the total amount of the Ba may be supported on the composite ceria.

The noble metal catalyst may include an amount of about 80 to about 90 wt % of the Pt, an amount of about 5 to about 10 wt % of the Pd, and an amount of about 5 to about 10 wt % of the Rh based on the total weight of the noble catalyst.

The Pt may be supported on the ceria, and the supported amount of the Pt may be in a range of about 10 to about 25 wt % of based on the total amount of Pt. A noble metal catalyst of a Pt/Pd alloy may be supported on the Mg-substituted alumina ($MgAl_2O_4$), and the noble metal catalyst may be supported in an amount of about 30 to about 50 wt % of the Pt based on the total amount of the Pt and in an amount of about 80 to about 100 wt % of the Pd based on the total amount of the Pd.

A noble metal catalyst of a combination of Pt and Rh may be supported on the composite ceria, and the noble metal catalyst may be supported in an amount of about 40 to about 60 wt % of the Pt based on the total amount of the Pt and in an amount of about 80 to about 100 wt % of the Rh based on the total amount of the Rh.

The coating layer may comprise: the Mg-substituted alumina ($MgAl_2O_4$) in an amount of about 20 to about 40 wt %; the ceria ($CeO_2$) in an amount of about 20 to about 40 wt %; the composite ceria in an amount of about 20 to about 40 wt %; the Ba in an amount of about 5 to about 15 wt %; and the noble metal catalyst in an amount of less than or equal to about 1.5 wt %, based on the total weight of the coating layer.

Also provided is the coating layer of the invention that consists essentially of, or consists of the components as described herein. For example, the coating layer that is included in the catalyst consists essentially of or consists of: the Mg-substituted alumina ($MgAl_2O_4$) in an amount of about 20 to about 40 wt %; the ceria ($CeO_2$) in an amount of about 20 to about 40 wt %; the composite ceria in an amount of about 20 to about 40 wt %; the Ba in an amount of about 5 to about 15 wt %; and the noble metal catalyst in an amount of less than or equal to about 1.5 wt %, based on the total weight of the coating layer.

The Mg-substituted alumina ($MgAl_2O_4$) may be formed in a spinel structure.

The composite ceria may be a mixture of $CeO_2$ and at least one oxide selected from the group consisting of Al, Si, La, Pr, Zr, Nd, and combinations thereof.

The composite ceria may include the $CeO_2$ in an amount of about 60 to about 90 wt %, and at least one oxide selected from the group consisting of Al, Si, La, Pr, Zr, Nd, and combinations thereof in an amount of about 10 to about 40 wt %, based on the total weight of the composite ceria.

The Mg-substituted alumina ($MgAl_2O_4$) may have an average particle diameter ranging from about 7 to about 15 μm. The ceria ($CeO_2$) may have an average particle diameter ranging from about 2 to about 7 μm. The composite ceria may have an average particle diameter ranging from about 2 to about 7 μm.

In a further preferred aspect, provided is a catalyst system for abating a nitrogen oxide. The nitrogen oxide may be, but not limited to, a nitrogen oxide in exhaust gas and the above-described catalyst may be used for abating the nitrogen oxide by intercalating the nitrogen oxide.

The catalyst system for abating a nitrogen oxide may be operated in a lean-burn engine having a theoretical air-fuel (A/F) ratio of greater than or equal to about 14.7:1.

Accordingly, preferred catalysts for abating a nitrogen oxide may provide improved intercalation performance for reducing the nitrogen oxide and preferred catalyst system for abating a nitrogen oxide including the catalyst as described here may be obtained Further provided are vehicles including automotive vehicles that comprise a catalyst as disclosed herein, particularly for use to abate nitrogen oxide in exhaust gas.

Other aspects of the invention are disclosed infra.

Figure 1:
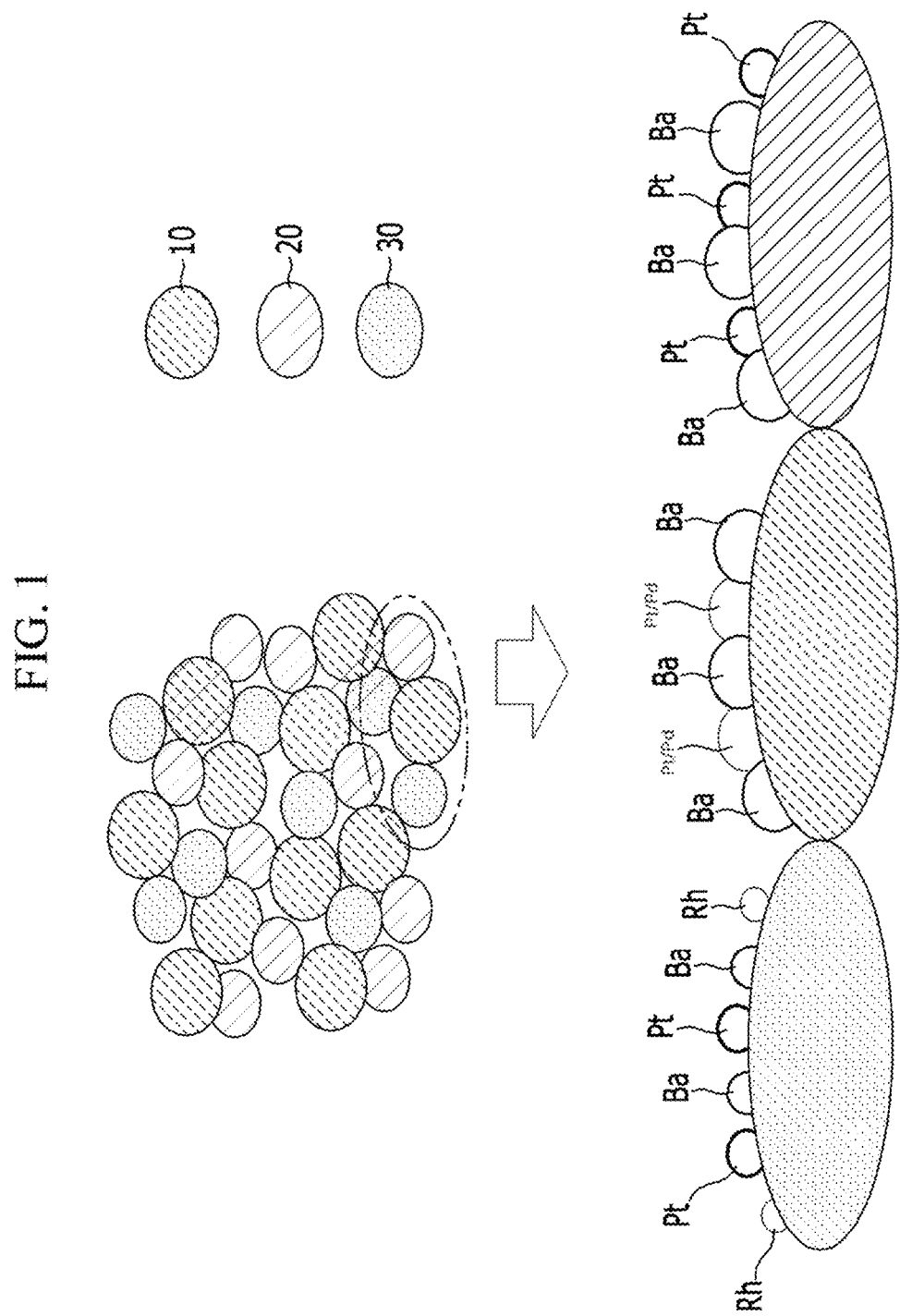
FIG. 1 shows components of an exemplary coating layer and disposition of the components according to an exemplary embodiment of the present invention.

Reference numerals set forth in the FIGS. 1-6 include reference to the following elements as further discussed below:

10: Mg-substituted alumina ($MgAl_2O_4$)
20: ceria ($CeO_2$)
30: composite ceria

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Exemplary embodiments will hereinafter be described in detail, and may be easily performed by those who have common knowledge in the related art.

However, this disclosure may be embodied in many different forms and is not construed as limited to the exemplary embodiments set forth herein.

As used herein, platinum group metal (PGM) may be a noble metal which includes Pt, Pd, Rh, and the like.

In the specification, "a combination thereof" includes an alloy of at least two metals, for example, an alloy of noble metal selected from the group consisting of Pt, Pd, Rh, and mixtures thereof.

As used herein, a high temperature region refers to a region where oxidation of NO is activated by a platinum group metal (PGM), and $Ba/MgAl_2O_4$ among intercalation materials contributes to intercalation of NOx, and in general. The high temperature region may be a temperature region of greater than or equal to about 250° C. based on a catalyst temperature. In addition, at the high temperature, reduction of the nitrogen oxide (NOx) intercalated during the control of its rich condition may be activated.

As used herein, a low temperature region refers to a region where a fair amount of the NO is oxidized by PGM, and NOx is mainly intercalated by $Ba/CeO_2$ among the intercalation materials, and in general. The low temperature region may be a temperature region of less than or equal to about 250° C. based on a catalyst temperature for intercalation of the NO by $BaNO_3$ after oxidation and adsorption of the NO by the $CeO_2$ and the composite ceria. In addition, in the low temperature region, a large amount of the nitrogen oxide may be released, while reduction of the nitrogen oxide (NOx) intercalated during the control of the rich state of the nitrogen oxide (NOx) is not activated.

Here, a lean state indicates a state in which the air to fuel ratio (air/fuel ratio) is large (i.e. a state in which the fuel concentration is low), and a rich state indicates a state in which the air to fuel ratio (air/fuel ratio) is small (i.e. a state in which the fuel concentration is high).

The catalyst for abating a nitrogen oxide may include a honeycomb substrate including a plurality of cell passages partitioned with a cell barrier rib, such that a coating layer may be disposed on the internal side of the cell passages.

Hereinafter, the coating layer included in the catalyst for abating a nitrogen oxide according to an exemplary embodiment of the present invention is illustrated referring to FIG. 1.

FIG. 1 illustrates exemplary components of the coating layer and disposition thereof according to an exemplary embodiment of the present invention and.

The coating layer may include a support including Mg-substituted alumina ($MgAl_2O_4$) 10, ceria ($CeO_2$) 20, and composite ceria 30, and Ba and a noble metal catalyst selected from Pt, Pd, Rh and combinations thereof may be supported on the support.

The Mg-substituted alumina ($MgAl_2O_4$) may be used instead of alumina. When alumina is used, alumina reacts with the Ba and forms $BaAl_2O_4$, and thus nitrogen oxide (NOx) intercalation performance of the Ba may be deteriorate. In other words, formation of a Ba-alumina compound may be suppressed by substituting Mg for the alumina.

The Mg-substituted alumina ($MgAl_2O_4$) may have an ideal spinel structure by adding about 25 to about 33 wt % of the Mg based on the total amount of MgO during the synthesis.

In particular, the Ba supported on the Mg-substituted alumina ($MgAl_2O_4$) may relate to nitrogen oxide intercalation performance at a substantially high temperature region.

On the other hand, the Ba supported on the ceria may relate to nitrogen oxide intercalation performance at a substantially low temperature region.

The composite ceria may improve heat resistance, sulfur resistance, and CO/HC/NOx oxidation performance at a low temperature region compared with the ceria.

Particularly, the improved heat resistance may maintain dispersion of a PGM and the improved sulfur resistance may maintain PGM activation after sulfur poisoning.

The composite ceria may have substantially reduced NOx intercalation performance in a low temperature region compared with the ceria but may have improved CO/HC/NO oxidation performance in the low temperature region, and thus may promote the NOx intercalation performance in the low temperature region and compensate the deterioration of NOx intercalation performance in the low temperature region.

The Ba in an amount of about 50 to about 70 wt % based on the total amount of the Ba may be supported on the Mg-substituted alumina ($MgAl_2O_4$), about 30 to about 50 wt % of the total amount of the Ba may be supported on the ceria ($CeO_2$), and less than or equal to about 20 wt % of the total amount of the Ba may be supported on the composite ceria.

When the Mg-substituted alumina ($MgAl_2O_4$) is used as a main support of the Ba by supporting an amount of about 50 to about 70 wt % of the total amount of the Ba on the Mg-substituted alumina ($MgAl_2O_4$), nitrogen oxide intercalation performance in a middle•high temperature region of greater than or equal to about 300° C. may be improved.

The nitrogen oxide intercalation performance in a low temperature region may be secured by supporting the Ba in an optimal amount on the ceria within the range described above.

The amount of the Ba supported on the composite ceria may be minimized such that the composite ceria may be used as a support for a PGM and thus promote oxidation of CO, HC, NO, and the like.

The noble metal catalyst may include the Pt in an amount of about 80 to about 90 wt %, the Pd in an amount of about 5 to about 10 wt %, and the Rh in an amount of about 5 to about 10 wt %, based on the total weight of the noble metal catalyst.

In particular, the Pt may be supported on the ceria in an amount about 10 to about 25 wt % of the total amount of the Pt. A Pt/Pd alloy of a noble metal catalyst may be supported on the Mg-substituted alumina ($MgAl_2O_4$), and the Pt may be supported in an amount of about 30 to about 50 wt % of the total amount of the Pt, while the Pd may be supported in an amount of about 80 to about 100 wt % of the total amount of the Pd.

When the noble metal catalyst of the Pt/Pd alloy is supported on the Mg-substituted alumina ($MgAl_2O_4$), heat resistance and polydispersity may be improved.

In addition, when a combination of Pt and Rh of a noble metal catalyst is supported on the composite ceria, the Pt in an amount of about 40 to about 60 wt % of the total amount of the Pt and the Rh in an amount of about 80 to about 100 wt % of the total amount of the Rh may be supported thereon.

When the Pt and the Rh in a high concentration are supported on the composite ceria, oxidation of the CO, HC, NO, and the like may be promoted. In particular, dispersion efficiency may be maximized by supporting greater than or equal to about 40 wt % of the total amount of the Pt on the composite ceria, and the dispersion efficiency and heat resistance may be improved by supporting greater than or equal to about 80 wt % of the total amount of the Rh on the composite ceria.

The coating layer may include about 20 to about 40 wt % of the Mg-substituted alumina ($MgAl_2O_4$), about 20 to about 40 wt % of the ceria ($CeO_2$), about 20 to about 40 wt % of the composite ceria, about 5 to about 15 wt % of the Ba, and less than or equal to about 1.5 wt % of the noble metal catalyst based on the total weight of the coating layer.

The Mg-substituted alumina ($MgAl_2O_4$) may be formed in a spinel structure. Since Mg-substituted alumina is formed in the spinel structure, loss of NOx intercalation performance of Ba may be prevented when a conventional $Al_2O_3$ reacts with the Ba and produces $BaAl_2O_4$ at a high temperature region.

The composite ceria may be a mixture of $CeO_2$ with at least one oxide selected from the group consisting of Al, Si, La, Pr, Zr, Nd, and combinations thereof.

The $CeO_2$ may be included in an amount of about 60 to about 90 wt %, and at least one oxide selected from the group consisting of Al, Si, La, Pr, Zr, Nd, and combinations thereof may be included in an amount of about 10 to about 40 wt % based on the total weight of the composite ceria.

The oxide may be, but not limited to, $ZrO_2$, $Pr_5O_{11}$, and a combination thereof.

In particular, a material including an amount of about 85 wt % of the $CeO_2$ and substituted with an amount of about 10 wt % of the $ZrO_2$ and an amount of about 5 wt % of the $Pr_5O_{11}$ based on the total weight of the composite ceria may be included in the composite ceria according to an exemplary embodiment of the present invention.

The Mg-substituted alumina ($MgAl_2O_4$) may have an average particle diameter ranging from about 7 to about 15 µm, the ceria ($CeO_2$) may have an average particle diameter ranging from about 2 to about 7 µm, and the composite ceria may have an average particle diameter ranging from about 2 to about 7 µm.

When each component including the support has an average particle diameter within the ranges, a gap may be formed between the particles, and thus exhaust gas may be diffused substantially in an LNT catalyst having a sustainably thick coating layer due to a large amount of a wash coat.

The catalyst for abating a nitrogen oxide may further include a binder and/or a dispersing agent. The binder may be, but not limited to, polyvinyl alcohol (PVA), polyvinylpyrrolidone (PVP), polyurethane (PU), polyetherurethane, a polyurethane copolymer, cellulose acetate, cellulose acetate propionate, cellulose acetate butylate, polymethylmethacrylate (PMMA), polymethylacrylate (PMA), a polyacryl copolymer, polyvinylacetate (PVAc), polyvinylacetate copolymer, polyfurfuryl alcohol (PPFA), polystyrene (PS), a polystyrene copolymer, polyethylene oxide (PEO), polypropylene oxide (PPO), a polyethylene oxide copolymer, a polypropylene oxide copolymer, polycarbonate (PC), polyvinylchloride (PVC), polycaprolactone (PCL), polyvinylidene fluoride (PVDF), a polyvinylidene fluoride copolymer, and polyamide, and the dispersing agent may be, but not limited to, polyacrylic acid, polymethacrylic acid, pyrophosphoric acid, citric acid, polymalic acid, ammonium polymethacrylate, benzoic acid, catechol, pyrogallol, and the like.

The binder may improve adherence of the coating layer to a substrate, and the dispersing agent may substantially disperse the binder particles.

In a further preferred aspect, a catalyst system for abating a nitrogen oxide may include a nitrogen oxide existing in exhaust gas and the catalyst for abating a nitrogen oxide by intercalating the nitrogen oxide.

The catalyst system for abating a nitrogen oxide may be operated in a lean-burn engine having a theoretical air-fuel (A/F) ratio of greater than or equal to about 14.7:1.

In addition, the catalyst for abating a nitrogen oxide according to the present invention may be prepared by wash-coating an oxide of a catalyst component and a noble metal on a porous honeycomb. The wash-coating method generally used in the art may be used without limitation to prepare the catalyst of the present invention.

Hereinafter, the embodiments are illustrated in more detail with reference to examples. However, these examples are exemplary, and the present disclosure is not limited thereto.

EXAMPLE

Preparation of LNT Catalyst

Example 1

An LNT catalyst was manufactured by using an amount of about 25 wt % of Mg-substituted alumina, an amount of about 35 wt % of ceria ($CeO_2$), an amount of about 32 wt % of composite ceria, an amount of about 7 wt % of Ba of a NOx-intercalating material on the basis of BaO, and an amount of about 1 wt % of a PGM (Pt, Pd, and Rh) based on the total weight of a wash coat.

The Ba was disposed as an acetate-based precursor, and herein, an amount of about 40 wt % of the total amount of the Ba was disposed on the ceria, an amount of about 50 wt % of the total amount of the Ba was disposed on the Mg-substituted alumina, and an amount of about 10 wt % of the total amount of the Ba was disposed on the composite ceria, and then the Pt, Pd and Rh were respectively dispersion-supported on the Mg-substituted alumina, ceria, and composite ceria using a general impregnation method.

The Pt, Pd and Rh were used in a weight ratio of about 85:10:5, an amount of about 10 wt % of the total amount of the Pt was impregnated on the ceria, an amount of about 40 wt % of the total amount of Pt and the total amount of the Pd were impregnated on the Mg-substituted alumina, and an amount of about 50 wt % of the total amount of the Pt and the total amount of the Rh were impregnated on the composite ceria.

As for the Mg-substituted alumina, a raw material substituted with 30 wt % of MgO was used; as for the ceria, pure ceria was used; and the composite ceria including an amount of about 85 wt % of $CeO_2$, an amount of about 10 wt % of $ZrO_2$, and an amount of about 5 wt % of $Pr_5O_{11}$ substituted therein, based on the total weight of the composite ceria.

The raw material and the intercalation material/the noble metal were impregnated into a powder, the powder was made into a slurry, and about 400 g/L of the slurry was coated in a honeycomb carrier and then dried/baked at a temperature of about 500° C., thereby obtaining the LNT catalyst.

The obtained catalyst was hydro-thermally aged at a temperature of about 770° C. for about 48 hours, and then its activation performance was evaluated.

Comparative Example 1

An LNT catalyst was manufactured by using an amount of about 40 wt % of Mg-substituted alumina, an amount of about 45 wt % of ceria ($CeO_2$), an amount of about 14 wt % of Ba intercalating NOx on the basis of BaO, and an amount of about 1 wt % of PGM including Pt, Pd and Rh based on the total amount of a wash coat.

The Ba was disposed as an acetate-based precursor, and herein, an amount of about 50 wt % of the total amount of the Ba was disposed on the ceria and an amount of about 50 wt % of the total amount of the Ba was disposed on the Mg-substituted alumina, and then the Pt, Pd and Rh in a precursor state were respectively dispersion-supported on the Mg-substituted alumina and the ceria in a general impregnation method.

The Pt, Pd and Rh were used in a weight ratio of about 85:10:5, and herein, an amount of about 30 wt % of the total amount of the Pt and the total amount of the Rh were impregnated on the ceria, and an amount of about 70 wt % of the total amount of the Pt and the total amount of the Pd were impregnated on the Mg-substituted alumina.

As for the Mg-substituted alumina, a raw material substituted with an amount of about 20 wt % of MgO was used, and pure ceria was used as for the ceria.

The raw material and the intercalation material/the noble metal were impregnated into a powder, and the powder was used to manufacture the LNT catalyst according to the same method as described in Example 1.

Comparative Example 2

An amount of about 40 wt % of general heat-resistant alumina ($Al_2O_3$), an amount of about 45 wt % of ceria ($CeO_2$), an amount of about 14 wt % of Ba of a NOx intercalating material on the basis of BaO, and an amount of about 1 wt % of PGM including Pt, Pd and Rh were used based on the total amount of a wash coat.

The Ba is disposed as an acetate-based precursor, and herein, an amount of about 50 wt % of the total amount of the Ba was disposed on the ceria, while an amount of about 50 wt % of the total amount of the Ba was disposed on the alumina, and then the Pt, Pd and Rh in a precursor state were respectively dispersion-supported on the alumina and the ceria in a general impregnation method.

The Pt, Pd and Rh were used in a weight ratio of about 85:10:5, and herein, an amount of about 30 wt % of the total amount of the Pt and the total amount of the Rh were impregnated on the ceria, and an amount of about 70 wt % of the total amount of the Pt and the total amount of the Pd were impregnated on the alumina.

The raw material and the intercalation material/the noble metal were impregnated into a powder, and the powder was used to manufacture an LNT catalyst in the same manufacturing method as described in Example 1.

Comparative Example 3

An amount of about 30 wt % of general heat-resistant alumina ($Al_2O_3$), an amount of about 59 wt % of ceria ($CeO_2$), an amount of about 10 wt % of Ba of a NOx intercalating material on the basis of BaO, and an amount of about 1 wt % of PGM including Pt, Pd and Rh based on the total of a wash coat were used.

The Ba was disposed on an acetate-based precursor, and herein, an amount of about 50 wt % of the total amount of the Ba was disposed on the ceria, while an amount of about 50 wt % of the total amount of the Ba was disposed on the alumina, and then the Pt, Pd and Rh in a precursor state were respectively dispersion-supported on the alumina and the ceria in a general impregnation method.

The Pt, Pd and Rh were used in a weight ratio of about 85:10:5, and herein, an amount of about 30 wt % of the total amount of the Pt and the total amount of the Rh were impregnated on the ceria, and an amount of about 70 wt % of the total amount of the Pt and the total amount of the Pd were impregnated on the alumina.

The raw material and the intercalation material/the noble metal were prepared into a powder through impregnation, and the powder was used to manufacture an LNT catalyst in the same method as described in Example 1.

Evaluation Example 1: Surface Examination of Coating Layer

Figure 2:
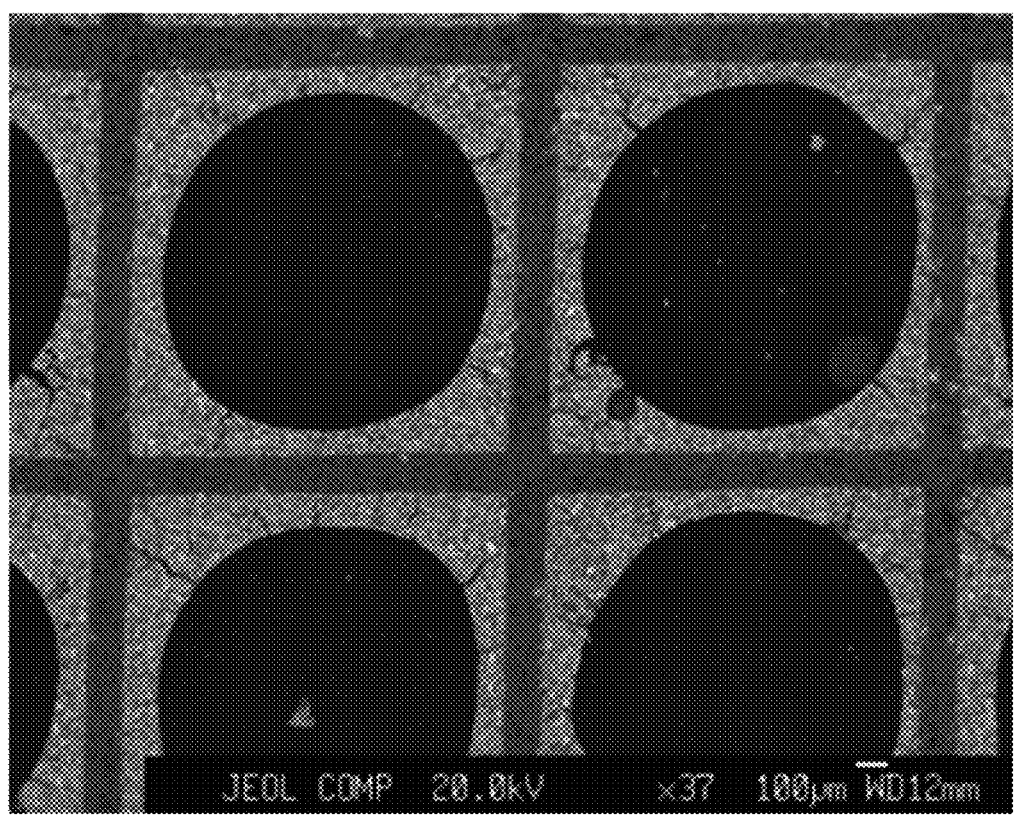
FIGS. 2 to 4 show images from scanning electron microscope (SEM) photographs of exemplary catalysts for abating a nitrogen oxide according to an exemplary embodiment of the present invention.
Figure 3:
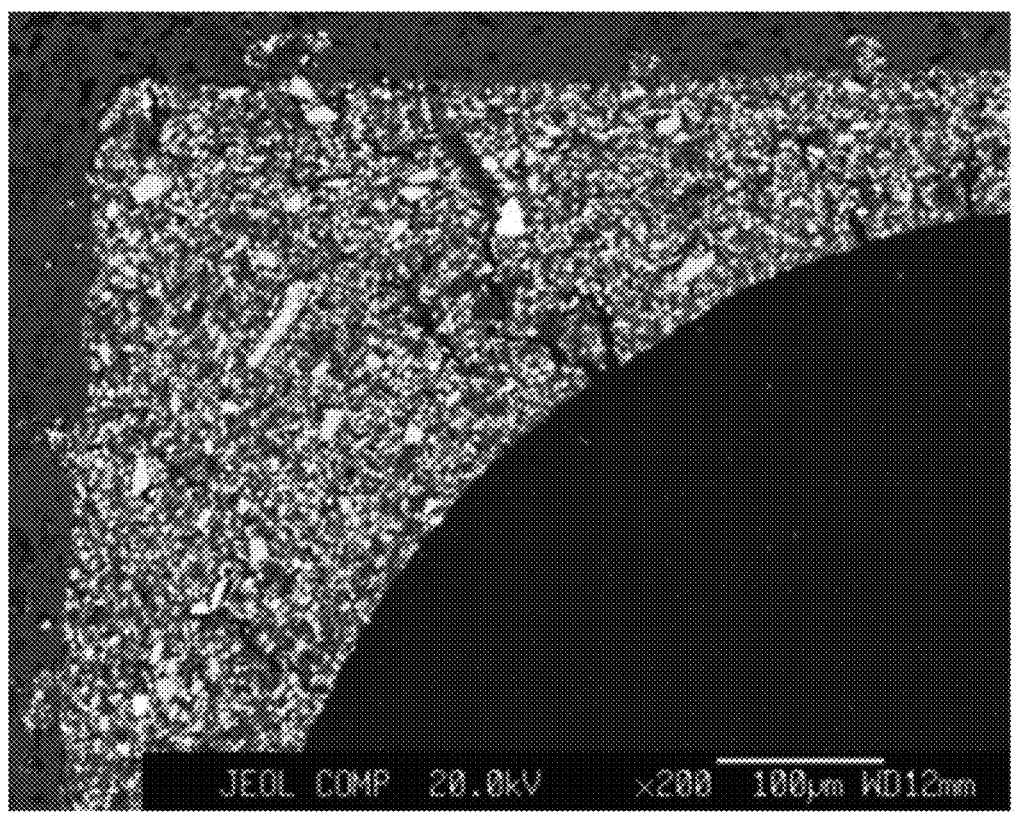
Figure 4:
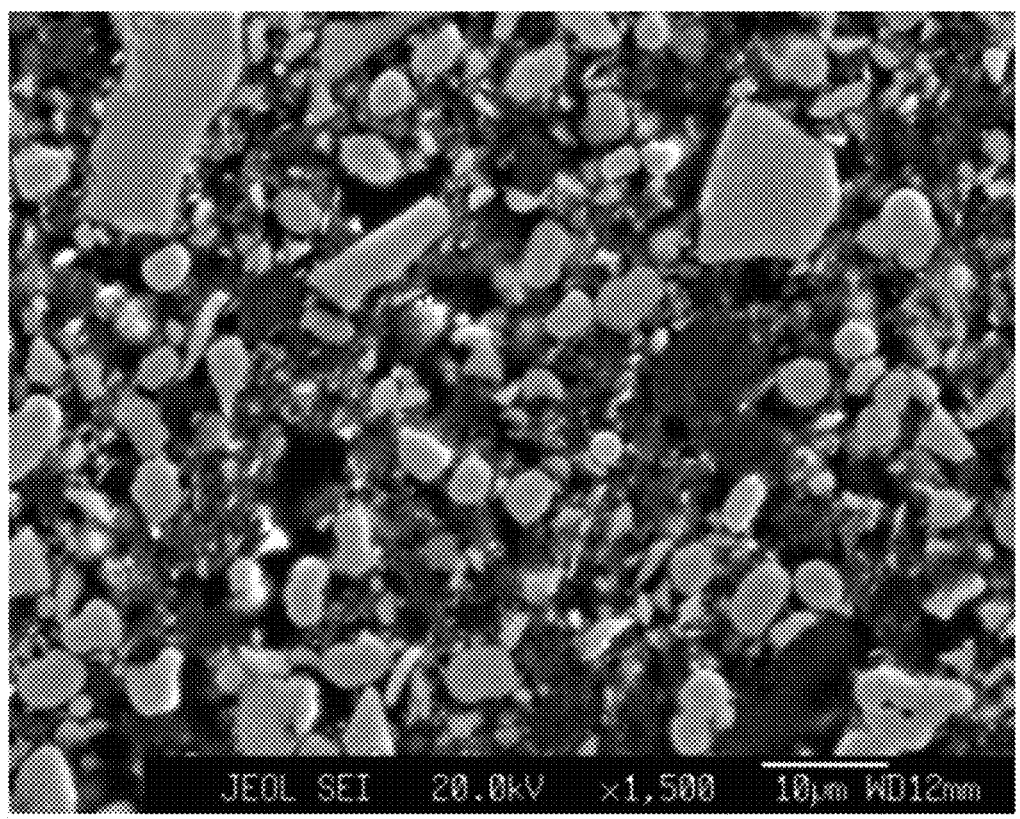

The surface of a coating layer on the internal side of a cell passage of the catalyst for abating a nitrogen oxide according to Example 1 was examined by using a field emission scanning electron microscope (FESEM, S-4700, Hitachi, Tokyo, Japan), and the results are provided in FIGS. 2 to 4.

FIGS. 2 to 4 show scanning electron microscope photographs (SEM) of the surface state of the cross-section of an exemplary catalyst for abating a nitrogen oxide according to an exemplary embodiment of the present invention.

As shown in FIG. 2, the catalyst for abating a nitrogen included a coating layer on the internal surface of a honeycomb substrate.

As shown in FIGS. 3 and 4, Mg-substituted alumina particles shown as gray particles and ceria particles shown as white particles are formed a network structure in a size of several micrometers.

Evaluation Example 2: NOx Slip Evaluation in a Rich Condition

Figure 5:
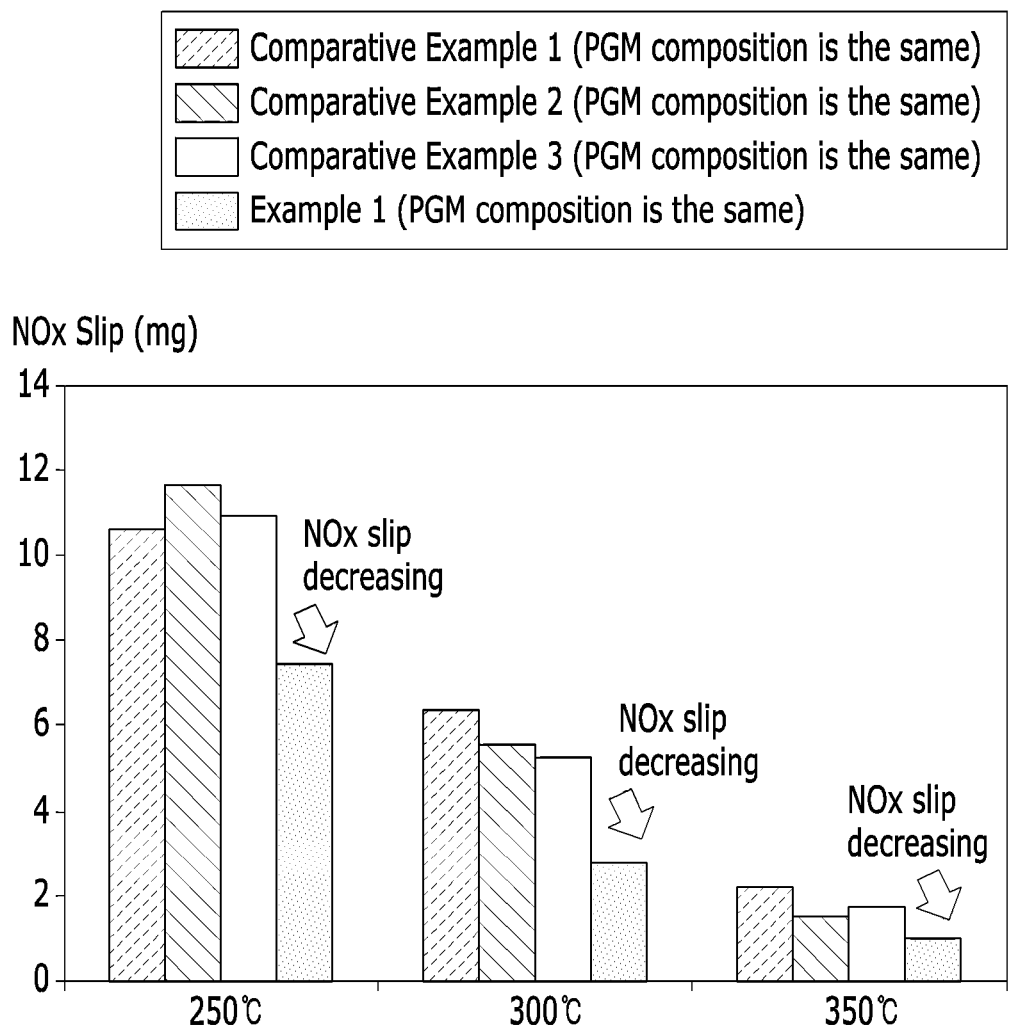
FIG. 5 is an exemplary graph evaluating the amount of slipped NOx during 20 seconds when a nitrogen oxide reaches a rich state.

NOx slip evaluation of the catalysts for abating nitrogen oxide according to Example 1 and Comparative Examples 1 to 3 was performed when a nitrogen oxide was in a rich state, and the results are shown in FIG. 5.

FIG. 5 is a graph showing the amount of NOx slipped from the catalysts for about 20 seconds when the nitrogen oxide was in a rich state.

The NOx slip evaluation was performed by intercalating about 30 mg of NOx under a lean condition where CO at about 1000 ppm, propylene at about 800 ppm C1, propane at about 200 ppm C1, NO at about 200 ppm, $CO_2$ at about 5%, $O_2$ at about 8%, $H_2O$ at about 5%, $N_2$ at a balance amount were included, controlling the catalysts under a rich condition where CO at about 20,000 ppm, propylene at about 6500 ppm C1, propane at about 1500 ppm C1, NO at about 200 ppm, $CO_2$ at about 5%, $O_2$ at about 0.7%, $H_2O$ at about 5%, $N_2$ at a balance amount were included for about 8 seconds, and then integrating the amount of NOx which was not reduced and removed but released from the catalysts for about 20 seconds.

As shown in FIG. 5, the catalyst for abating a nitrogen oxide according to an exemplary embodiment of the present invention released a sharply reduced amount of nitrogen oxide and showed a NOx slip section.

Evaluation Example 3: Purification Rate of Nitrogen Oxide Due to Reduction of NOx A nitrogen oxide purification rate of the catalysts for abating nitrogen oxide according to Example 1 and Comparative Examples 1 to 3 was evaluated, and the results are provided in FIG. 6.

Figure 6:
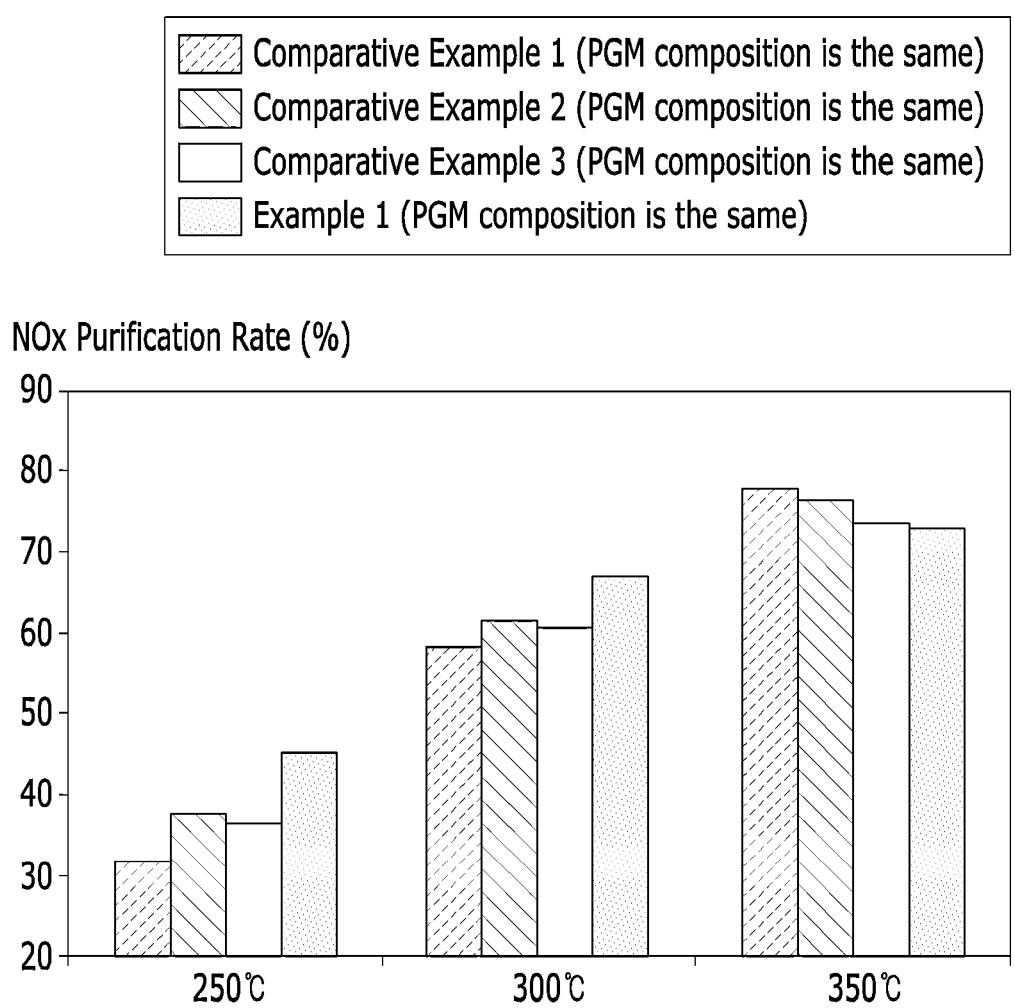
FIG. 6 is an exemplary graph providing a purification rate of a nitrogen oxide by using an exemplary catalyst for abating a nitrogen oxide according to an exemplary embodiment of the present invention.

FIG. 6 is a graph showing the nitrogen oxide purification rate of the catalysts for abating nitrogen oxide.

The nitrogen oxide purification rate was calculated by flowing about 200 ppm of NOx into the catalyst under a lean condition for about 180 seconds, and then controlling the catalyst under a rich condition of NOx for about 8 seconds under the same lean/rich gas conditions as the NOx slip evaluation, measuring the integration amount of the NOx released for about 188 seconds in both lean/rich sections, and using the following Calculation Equation 1.

The nitrogen oxide purification rate=(The integration amount of catalyst inlet NOx−The integration amount of catalyst outlet NOx)/The integration amount of catalyst inlet NOx   [Calculation Equation 1]

Pt and Rh While this invention has been described in connection with what is presently considered to be various exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for abating a nitrogen oxide, comprising:
a honeycomb substrate comprising a plurality of cell passages partitioned with a cell barrier rib; and
a coating layer positioned on the internal side of the cell passages,
wherein the coating layer comprises,
a support comprising Mg-substituted alumina ($MgAl_2O_4$), ceria ($CeO_2$) and a composite ceria; and
Ba and a noble metal catalyst selected from the group consisting of Pt, Pd, Rh and combinations thereof supported on the support,
wherein an amount of 50 to 70 wt % of the total of the Ba is supported on the Mg-substituted alumina ($MgAl_2O_4$), an amount of 30 to 50 wt % of the total amount of the Ba is supported on the ceria ($CeO_2$), and an amount less than or equal to 20 wt % of the total amount of the Ba is supported on the composite ceria.

2. The catalyst of claim 1, wherein the noble metal catalyst comprises:
the Pt in an amount of 80 to 90 wt % based on the total weight of the noble metal catalyst;
the Pd in an amount of 5 to 10 wt % based on the total weight of the noble metal catalyst; and
the Rh in an amount of 5 to 10 wt % based on the total weight of the noble metal catalyst.

3. The catalyst of claim 1, wherein an amount of 10 to 25 wt % of the total amount the Pt is supported on the ceria.

4. The catalyst of claim 1, wherein the noble metal catalyst supported on the Mg-substituted alumina ($MgAl_2O_4$) is a Pt/Pd alloy, and the Pt/Pd alloy is supported in an amount of 30 to 50 wt % of the total amount of the Pt and in an amount of 80 to 100 wt % of the total amount of the Pd.

5. The catalyst of claim 1, wherein noble metal catalyst supported on the composite ceria is a Pt and Rh combination, and the Pt and Rh combination is supported in an amount of 40 to 60 wt % of the total amount of the Pt and in an amount of 80 to 100 wt % of the total amount of the Rh.

6. The catalyst of claim 1, wherein the coating layer comprises:
the Mg-substituted alumina ($MgAl_2O_4$) in an amount of 20 to 40 wt % based on the total weight of the coating layer;
the ceria ($CeO_2$) in an amount of 20 to 40 wt % based on the total weight of the coating layer;
the composite ceria in an amount of 20 to 40 wt % based on the total weight of the coating layer;
the Ba in an amount of 5 to 15 wt % based on the total weight of the coating layer; and
the noble metal catalyst in an amount of less than or equal to 1.5 wt % based on the total weight of the coating layer.

7. The catalyst of claim 1, wherein the coating layer consists essentially of:
the Mg-substituted alumina ($MgAl_2O_4$) in an amount of 20 to 40 wt % based on the total weight of the coating layer;
the ceria ($CeO_2$) in an amount of 20 to 40 wt % based on the total weight of the coating layer;
the composite ceria in an amount of 20 to 40 wt % based on the total weight of the coating layer;
the Ba in an amount of 5 to 15 wt % based on the total weight of the coating layer; and
the noble metal catalyst in an amount of less than or equal to 1.5 wt % based on the total weight of the coating layer.

8. The catalyst of claim 1, wherein the Mg-substituted alumina ($MgAl_2O_4$) is formed in a spinel structure.

9. The catalyst of claim 1, wherein the composite ceria is a mixture of $CeO_2$ and at least one oxide selected from the group consisting of Al, Si, La, Pr, Zr, Nd and combinations thereof.

10. The catalyst of claim 9, wherein the composite ceria comprises:
the $CeO_2$ in an amount of 60 to 90 wt %; and at least one oxide selected from the group consisting of Al, Si, La, Pr, Zr, Nd and combinations thereof in an amount of 10 to 40 wt %, based on the total weight of the composite ceria.

11. The catalyst of claim 1, wherein the Mg-substituted alumina ($MgAl_2O_4$) has an average particle diameter ranging from 7 to 15 μm.

12. The catalyst of claim 1, wherein the ceria ($CeO_2$) has an average particle diameter ranging from 2 to 7 μm.

13. The catalyst of claim 1, wherein the composite ceria has an average particle diameter ranging from 2 to 7 μm.

14. A catalyst system for abating a nitrogen oxide comprising a nitrogen oxide in exhaust gas and the catalyst for abating the nitrogen oxide of claim 1 by intercalating the nitrogen oxide.

15. The catalyst system of claim 14, which is operated in a lean-burn engine having a theoretical air-fuel (A/F) ratio of greater than or equal to 14.7:1.

16. A vehicle comprising a catalyst of claim 1 for use to abate nitrogen oxide in exhaust gas.

* * * * *